March 19, 1929.　　S. L. HERZLICH　　1,705,729
AUTOMATIC ANTIFREEZE SYSTEM FOR AUTO RADIATORS
Filed March 19, 1927
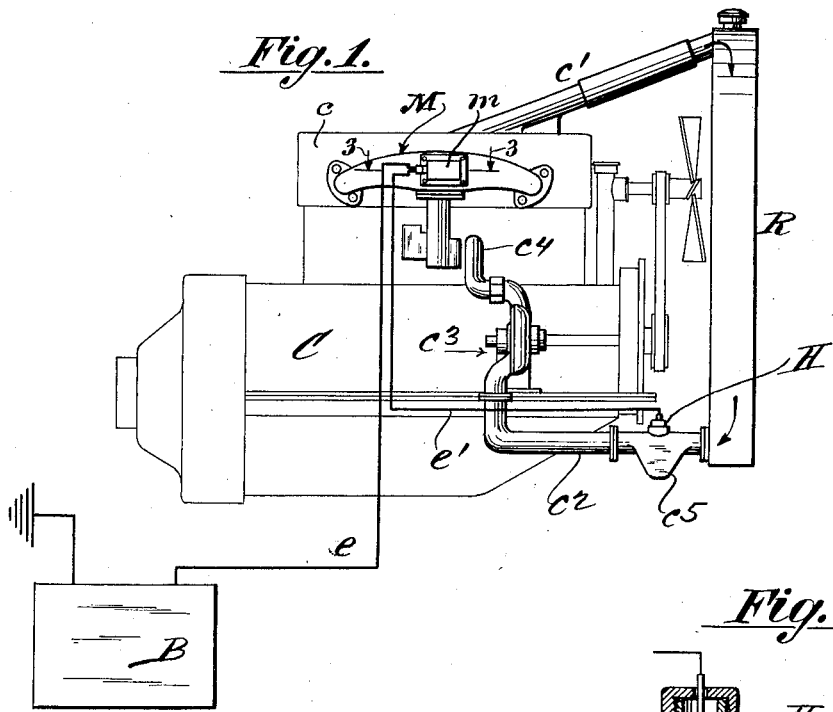
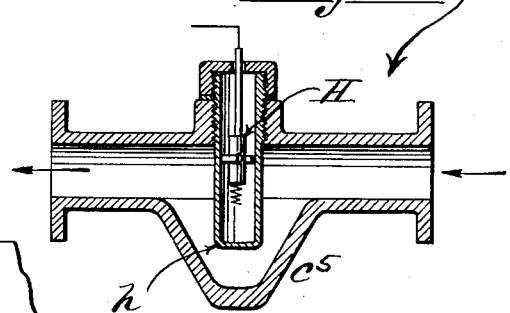
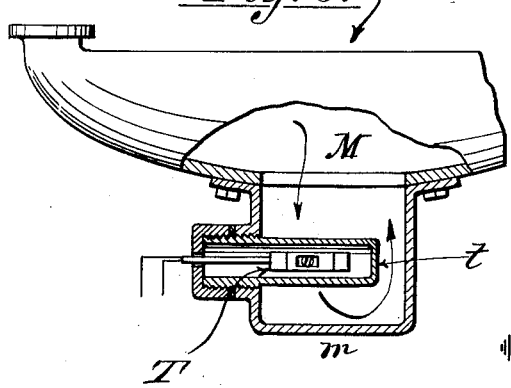
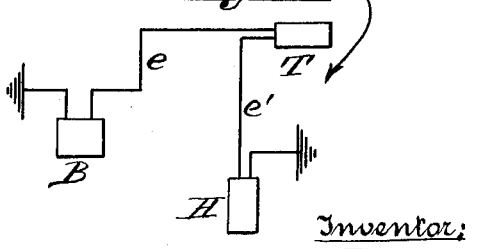
Inventor:
Samuel L. Herzlich,
By his Attorney,
Geo. Wm. Miatt Patented Mar. 19, 1929.

1,705,729

UNITED STATES PATENT OFFICE.

SAMUEL L. HERZLICH, OF BROOKLYN, NEW YORK.

AUTOMATIC ANTIFREEZE SYSTEM FOR AUTO RADIATORS.

Application filed March 19, 1927. Serial No. 176,653.

The object of my invention is to afford simple, but effective means whereby the temperature of the water of the circulatory cooling system of an internal combustion engine and its radiator, as used in automobiles, may be automatically maintained above a prescribed degree to prevent freezing of the liquid when the motor is at rest in freezing weather, thus obviating danger of injury to the mechanism and delay in operation; and to this end the invention consists substantially in the combination and co-relation, in electrical circuit, of an electric heating element positioned in the lower part of the cooling liquid circuit, and of a thermostat connected with and controlling said heating element and associated closely with the engine in the zone of heat generated thereby whereby when the engine has become sufficiently heated the current to the heater will be cut off and electrical energy conserved.

In the accompanying drawings, I illustrate the preferred embodiment of my invention as applied to a motor of the character designated, although I do not restrict myself to the identical construction and arrangement of parts and connections shown by way of exemplification, since changes may be made in minor details, and equivalent mechanical expendients resorted to with like results, and without departing from the spirit and intent of my invention in this respect.

With this understanding:—

Fig. 1, represents more or less diagrammatically an elevation of a motor and its radiator equipped with my antifreeze means in which arrangement the thermostat is connected with the exhaust manifold;

Fig. 2, is a central longitudinal section of the electric heating element casing, the heating element being indicated symbolically in elevation;

Fig. 3, is a sectional elevation taken upon plane of line 3—3, Fig. 1, showing the thermostat mount;

Fig. 4, is a diagram of the electric circuit involved;

In Fig. 1, the engine casing C, and certain other parts of the motor are indicated in outline. The water jacket portion is connected by the upper outgoing liquid conduit $c'$, with the top of the radiator R, the bottom of which latter is connected with said water jacket $c$, through the medium of the lower return conduit $c^2$, pump $c^3$, and return conduit $c^4$, as is usual in such cases, the fluid in said cooling system being circulated by said pump in the direction of the arrows.

The electrical heat element H, is enclosed in a tubular casing $h$, inserted in a section $c^5$, of the lower liquid return conduit $c^2$, as shown more particularly in Fig. 2 of the drawings, its function being to impart a gentle heat under certain conditions to the liquid in the cooling system to prevent freezing and the attending dangers.

In a similar manner the thermostat T, is enclosed in a tubular casing $t$, inserted either in an offset $m$, of the engine exhaust manifold M, as shown in Figs. 1 and 3, of the drawings.

The electrical heating element H, and the thermostat T, are included in a common electric circuit $e$, $e'$, which when closed is energized by a battery B, or other source of electricity. For instance, when the electric circuit is closed by the thermostate T, the current passes from the battery B through the wire $e$, to and through the thermostat T, and wire $e'$, to the heating element H, and thence to the battery through a common ground as shown in Fig. 4.

An obvious result is that if the thermostat T, is set to close the electrical circuit at a temperature of, say, 35° Fahrenheit, or any prescribed degree above the freezing point of the circulatory liquid, whenever the latter cools sufficiently the thermostat will automatically cause the energizing of the heating element H, and thereby maintain a safe temperature throughout the water cooling system, or in other words, will prevent freezing.

When the engine is started the heat generated thereby will act almost instantly on the thermostat T, so as to open the circuit and cut off the current to the heater and so conserve the current.

It is to be understood that the storage battery with which automobiles are usually equipped may be utilized as the source of electrical energy for the heating element as thus controlled by the thermostat, and that the latter will close the circuit automatically when the temperature drops to the prescribed minimum degree, and automatically open the circuit when that degree of heat is exceeded, the sole object being to maintain the engine system, as a unit, in operative condition when exposed to external cold, as in winter.

What I claim as my invention and desire to secure by Letters Patent, is:—

In a water-cooled internal combustion engine, having a radiator, pipes for leading water to and from the radiator, and an exhaust pipe for carrying away the gases of combustion from the engine, the combination of an electrical heater positioned in one of the water pipes for heating the water therein, a thermostat carried by the exhaust pipe so as to be heated by the heat of gases of combustion, and a source of current; the heater, thermostat and source of current being connected so that the thermostat will open the circuit through the heater as soon as the engine is started, and will close the circuit when the engine has cooled to a certain temperature.

SAMUEL L. HERZLICH.